ent Office 2,703,289
Patented Mar. 1, 1955

2,703,289

CEMENT BOUND LIGHTWEIGHT AGGREGATE MASSES

Corwin D. Willson, Flint, Mich.

No Drawing. Application October 23, 1950,
Serial No. 191,719

4 Claims. (Cl. 106—93)

This invention relates to molded masses made from highly porous lightweight aggregate particles dispersed in a calcareous binder after the pores of the particles have been clogged with a clayey colloid. Since these masses are improvements of those described in a number of my co-pending applications, this constitutes a continuation-in-part of those applications which are: Ser. Nos. 485,642, filed May 4, 1943, abandoned March 29, 1952; 506,772, since issued as Patent No. 2,548,576; 631,373, filed November 28, 1945, now abandoned; 649,771, filed February 23, 1946, now abandoned; 681,400, filed July 3, 1946, since issued as Patent 2,674,775; 768,942, filed August 15, 1947, abandoned June 10, 1952; and 793,336, filed December 22, 1947, since issued as Patent No. 2,553,618.

One of the main present worldwide needs in the building industry is a lightweight aggregates concrete of low cost that has a density approaching that of wood, i. e., below 50 pounds per cubic foot, but that is strong enough to meet building code requirements for a load-bearing material. In many communities, this calls for a concrete having a compressive strength not less than 1000 p. s. i. In the brochure "Lightweight Aggregate Concretes" published August 1949 by the Housing and Home Finance Agency, not a single lightweight aggregate concrete weighing under 50 pounds per cubic foot is shown having the strength to meet such code requirements. The same is true in a report published March 1950 by the University of Idaho and describing four years' experiments with concretes made from wood fiber, Portland cement, clay and other ingredients. Thus, the primary object of this invention is a Portland cement concrete having a density dry of under fifty pounds per cubic foot and a compressive strength of between 1200 and 2000 pounds per square inch.

To achieve and perfect such a concrete and describe its special uses and methods of manufacture have constituted the objects of the above named co-pending applications. Each has described masses comprising mineral and/or vegetable fiber aggregate materials dispersed in a binding matrix largely of Portland cement. This matrix comprised also up to 15 per cent by weight of the cement of a chemical admixture. In nearly all instances, this admix included clay although what exact part the clay played in making the masses stronger and often lighter admittedly remained a matter of conjecture. Yet it long had been observed that specimens made by mixing the aggregate material in water with the admix before adding the Portland cement tested stronger than specimens made by adding the admix with or after the cement. It was also discovered that the amounts of clay in the admix could be increased to advantage, sometimes with a saving of cement, and that specific types of clay gave best results even while the exact role played by the clays remained obscure. In making and testing a very large number of test specimens, this role became clearer and the knowledge is here turned to practical advantage to achieve the primary object of the invention with universally available raw materials and those of relative low cost.

Lightweight aggregate materials suitable for use in concrete have a highly vesicular character, each particle housing a number of thin-walled blebs, pockets, cells or minute voids. Among materials of this type having a vegetable origin are: sawdust, shavings, milled wood wastes, wood wool, milled newspapers and finely divided plant fibers, both those retaining and those separated from their lignin. Among materials of this type having a mineral origin are: expanded (popcorn) slag, exfoliated vermiculite, popped perlite, pumice, cinders and baked bloating clays, slates and shales. Microphotographs taken of such vesicular aggregate particles, both mineral and vegetable, show surfaces more or less resembling sponges. When such aggregate material is mixed with plastic Portland cement, much of the cement paste gets into the pores of the particles and there is lost as a binding ingredient. In vegetable aggregate particles, the crushed and broken cells permit entrance into the particles of caustic limewater and this releases soluble constituents of the particles such as sugar that contaminate the cement binder, weakening it or wholly preventing its setting. Thus, another object of the invention is a molded mass of Portland cement bound highly porous lightweight aggregate particles, this mass strengthened by clogging the pores open at the surface of the particles with a clayey colloid to serve as a buffer concentrated between the ports and the binding matrix of cement.

Experiments with several hundred chemically reactive and inert mixtures have shown no single ingredient cheaper or more effective for clogging the pores of the aggregate particles before the addition of a calcareous binder than one selected from the group consisting of bleaching clay, kaolin, pyrophyllite, common plastic clay such as is generally locally available, colloidal clay, hydrous aluminum silicate and bentonite. Where the latter has previously been admixed with plastic Portland cement, the aim has been to diffuse it throughout the cement matrix: the assumption being that moisture penetrating the set and dried matrix by way of the capillaries would cause the bentonite particles in the matrix to swell sufficiently to block the capillaries to further moisture penetration. Hence bentonite was intimately mixed with the cement to obtain the widest possible diffusion within the matrix itself. Thus, another object of the invention is a molded mass made from highly porous aggregate material and a calcareous cement and an admix comprising clay in part colloidal, all or most of the constituents of the admix being mixed with water and utilized to clog the pores of the aggregate particles before the cement is added. The amounts and kinds of clay depend on the porosity of the aggregate materials and the dispersibility of the clay. Use of locally available clay is naturally of economic advantage and means of determining its character are hereinafter more fully described.

In the prior art, aggregate particles of vegetable origin have been "treated" with many different kinds of chemical solutions to coat or "mineralize" the particles so that a mineral binder such as Portland cement might have something substantially inorganic to bond with. My own objective lies in quite a different direction: to clog the pores with inert colloidal material. Experience teaches that this objective is attained most simply and cheaply by a short preliminary mixing of the porous aggregate particles in the mixwater with raw aluminum silicate, in part colloidal, and a wetting agent selected from the group consisting of sodium salt of pine resin (Vinsol NVX), sodium salt of an alkyl naphthalene sulfonic acid (Aerosol OS), alkyl aryl sodium sulfonate (Nacconal) and sodium salts of fatty alcohols and naphthenic acids, before addition of the binding agent.

Another object of the invention is a molded mass comprising porous aggregate material in part of vegetable origin diffused in a binder almost wholly of Portland cement and an admix concentrated between the pores of the aggregate particles and the cement and comprising in greater part clay and a calcium aluminate differing somewhat from that most common in Portland cement, and in lesser part a chloride selected from the group consisting of aluminum and calcium chlorides and calcium oxychloride, and in still lesser part of a sulfate selected from the group consisting of aluminum and calcium sulfates, gypsum, terra alba and plaster of Paris; the admix being 5–35 per cent by weight of the cement and the total sulfate in cement and admix not exceeding 7 per cent by weight of the cement, the chloride not exceeding 5 per cent by weight of the cement and the added calcium aluminate not exceeding 6 per cent by weight of the cement.

Popped perlite aggregate material may contain 7–10 per cent of soluble sodium and potassium salts while many vegetable aggregate materials contain soluble juices. Thus another object of the invention is a hardset molded mass made by mixing porous aggregate materials containing soluble constituents in water with clay and under 10 per cent by weight of the clay of a waterproofing agent to clog the pores against release therethrough of the soluble constituents before adding Portland cement, continuing the mixing and molding in a compact mass, the clay including colloids that swell when wet.

Another object of the invention is a porous aggregate concrete that weighs dry under 50 pounds per cubic foot, has a compressive strength above 1200 pounds per square inch and that contains per cubic yard not less than 5.6 nor more than 7.6 bags of Portland cement.

Another object of the invention is an admix for a mixture of porous vegetable aggregate particles and Portland cement, the admix devised to effectively clog the pores of the particles before mixing with the cement and thereafter to provide an expansive barrier between said pores and said cement: the admix including major proportions of clay in part colloidal, lesser proportions of three calcium salts swiftly reactive when wet to produce calcium sulphoaluminate, and very minor proportions of sodium sesqui-phosphate and a wetting agent.

Another object of the invention is a method of making lighter, stronger molded masses of Portland cement concrete from porous aggregate material: the method comprising the step of clogging the open pores of the aggregate material with a chemically inert colloid before mixing with the cement and molding in a compact mass.

These and other novel features and objects of the invention, hereinafter more fully described and claimed, make it possible to achieve lighter, stronger and cheaper molded masses from porous aggregate materials by attacking their point of common weakness, their surface porosity. By first clogging the pores of such aggregate materials as above named with one or more types of swellable ingredients, colloidal and crystalloidal, moldable masses approaching the density of wood are produced for building construction that are thermally insulative, fire-safe, rot and insect proof and weather resistant: masses that may be formed by hand or machine processes into boards, panels, blocks, bricks and tiles or, more directly, into walls, floors and roofs; that may be poured or applied with a trowel or sprayed; masses that particularly may utilize the abundant farm, forest and industrial by-product and waste materials that are available in such great variety throughout the world.

The various features of the invention and how these differ from those described in my co-pending applications are best understood by citing a number of examples of molded masses made, and of the components of said masses as prepared, according to the invention.

*Example 1*

For comparison, three batches of porous mineral aggregate material were mixed in water with an admix before adding high early strength Portland cement. In batch I, the porous aggregate material was expanded (popcorn) slag, 808 grams; water was 275 ml.; admix was a wetting agent (sodium salt of pine resin), 1/20 g.; cement was 227 g. In batch II, all ingredients were the same as in batch I except that to the admix of batch I was added bentonite, 10 g. In batch III, all ingredients were the same as in batch II except that to the admix of batch II was added sod. sesqui-phosphate (Quadrafos), 1/10 g. After the final set, hand-tamped specimens from each batch were cured for seven days in moist air, then oven dried and tested. Compression strengths in pounds per square inch from each batch averaged: I, 2383; II, 2625; III, 3075. Not only were specimens from batch III strongest but at 97.5 lbs. per cu. ft., they were by five pounds the lightest of the three batches. Bags of cement per cu. yd. were: I, 5.62; II, 5.88; III, 5.75. By using more clay in the admix for batches II and III, the same or greater strengths with less cement are possible.

*Example 2*

For comparison, five batches of porous mineral aggregate material were mixed in water with an admix before adding high early strength Portland cement. In batch I, porous aggregate material was popped perlite, 125 g.; water was 275 ml.; admix was wetting agent (sodium salt of pine resin, Vinsol NVX), 1/20 g.; cement was 227 g. In batch II, all ingredients were the same as in batch I except that to the admix of batch I was added bentonite, 10 g. In batch III, all ingredients were the same as in batch I except that to the admix of batch I was added hydrous aluminum silicate, 15 g. In batch IV, all ingredients were the same as in batch II except that, after cement was added, sod. sesqui-phosphate, 1/10 g. was mixed in. In batch V, all ingredients were the same as in batch II except that for the 10 g. of bentonite of the admix was substituted an ordinary locally obtained plastic clay, 40 g. After final set, specimens from each batch were cured, dried and tested as in Example 1. Compression strengths in p. s. i. were: I, 763; II, 1130; III, 1175; IV, 1250; V, 1300. Densities in pounds per cu. ft. were: I, 46; II, 48.5; III, 48.3; IV, 50; V, 49.7. Bags of cement per cu. yd. were: I, 6.88; II, 7.66; III, 7.60; IV, 7.78; V, 7.52.

*Example 3*

For comparison, three batches of porous mineral aggregate material were mixed in water with an admix before adding high early strength Portland cement (Peerless brand). In batch I, porous aggregate material was exfoliated vermiculite, 108 g.; water was 350 ml.; admix was calcium chloride, 5 g.; cement was 227 g. In batch II, porous aggregate materials were: exfoliated vermiculite, 83 g. and newspaper milled to pass 3/32" screen, 25 g.; water was 350 ml.; admix was bentonite, 1 g. and bleaching (Georgia) clay, 60 g. and high alumina cement, 8 g. and terra alba, 1 g. and calcium chloride, 5 g. and wetting agent, 1/20 g.; cement was 227 g. In batch III, porous aggregate material was same as in batch I and water, admix and cement were the same as in batch II. After final set, specimens from each batch were cured, dried and tested as in Example I. Compression strengths in p. s. i. were: I, 438; II, 687; III, 838. Densities in pounds per cu. ft. were: I, 47.3; II, 53.6; III, 58. Bags of cement per cu. yd. of concrete were: I, 7.72; II, 7.66; III, 7.60.

*Example 4*

For comparison, nine batches of porous vegetable aggregate material were mixed in water with an admix before adding high early strength Portland cement. In batch I, porous aggregate material was by-product and waste wood fiber including pine shavings, 110 g. and newspaper, 25 g. both milled to pass a 3/32" screen; water was 350 ml.; admix was wetting agent (alkyl aryl sodium sulfonate), 1/20 g. and calcium chloride, 5 g.; cement was 227 g. In batch II, all ingredients of batch I were present in identical amounts and the admix contained in addition: bentonite, 1 g. and bleaching clay, 60 g. and crude salicyclic acid, a by-product from manufacture of pure salicyclic acid, 1/20 g. and terra alba, 1 g. and high alumina cement, 7.5 g. In batches III, IV, V and VI, all ingredients of batch II were present in the same amounts except that water was increased to 400 ml., 425 ml., 475 ml. and 500 ml. respectively. In batch VII, all ingredients of batch II were present in the same amounts except that water was increased to 410 ml., high alumina cement to 8 g. and calcium chloride to 10 g. In batch VIII, all ingredients of batch VII were identical and to the admix sod. tetra phosphate, 1/10 g. was added. In batch IX all ingredients of batch VIII were identical except that the sodium tetra phosphate was added after instead of before the cement. After final set, specimens from each batch were cured, dried and tested as in Example I. Compression strengths in p. s. i. were: I, 900; II, 1567; III, 1400; IV, 1375; V, 1213; VI, 1031; VII, 1813; VIII, 1975; IX, 2175. Densities of the batches in pounds per cu. ft. were: I, 46; II, 55; III, 50.6; IV, 50.2; V, 46.6; VI, 44.1; VII, 49.3; VIII, 49.4; IX, 49.5. Bags of cement per cu. yard of concrete were: I, 7.25; II, 6.87; III, 6.34; IV, 6.18; V, 5.88; VI, 5.62; VII, 6.34; VIII, 6.45; IX, 6.45.

No better yardstick is known for gauging the significance of these examples than data from the brochure and report mentioned in the second paragraph of this specification. From that data the best strengths of concretes having densities below 50 lbs. per cu. ft. or using under 7.6 bags of Portland cement per cu. yd. and made from expanded slag, vermiculite, perlite and wood fiber porous aggregate materials are:

| Aggregate material | Bags cement per cu. yd. | Density in lbs. cu. ft. | Compressive strength, p. s. i. |
|---|---|---|---|
| Exp. slag | 6.4 to 7.18 | 91.6 to 94 | 2,240 to 2,450. |
| Exp. perlite | 6.86 to 7.3 | 51 | 870 to 875. |
| Exp. vermiculite | 7.39 to 7.6 | 42 to 49.8 | 465 to 715. |
| Wood fiber | (See note) | 48 to 49 | 503 to 704. |

NOTE.—Bulk not given but mixes were, by volume: Cement, 1 part; diatomite, 1 part; clay, 1 part; shavings milled to pass ¼" screen, 5 parts and 10 percent by weight of the cement of sod. silicate; and the same without the clay and silicate.

Following are comparable figures for batch I from each of my four examples and it is to be noted that clay constituents of my admix were absent from each of the batch I formulae:

| Aggregate material | Bags cement per cu. yd. | Density in lbs. cu. ft. | Compressive strength, p. s. i. |
|---|---|---|---|
| Exp. slag | 5.62 | 99.3 | 2,383 |
| Exp. perlite | 6.88 | 46 | 763 |
| Exp. vermiculite | 7.72 | 47.3 | 438 |
| Wood fiber | 7.25 | 46 | 900 |

Following are comparable figures for the best of the other batches in my four examples wherein the clay constituents of my admix are present and the molded masses are made according to the invention:

| Aggregate material | Bags cement per cu. yd. | Density in lbs. cu. ft. | Compressive strength, p. s. i. |
|---|---|---|---|
| Exp. slag | 5.75 | 97.5 | 3,075. |
| Exp. perlite | 7.52 | 49.7 | 1,300. |
| Exp. vermiculite | 7.60 | 58 | 838. |
| Wood fiber | 5.88 to 6.45 | 46.6 to 49.5 | 1,213 to 2,175. |

In the first two of these three tables of figures, it is apparent that there is no concrete having a density dry of under fifty pounds per cubic foot that has a strength sufficient to meet building code requirements of 1000 p. s. i. In the third of these tables, it is obvious that concrete made according to the invention from both popped perlite and wood fiber not only can meet code requirements at densities below 50 lbs. per cu. ft., but that they meet the primary object of the invention. In fact batch V of Example 2 and batches V, VII, VIII, and IX of Example 4 all attain the primary object of the invention: a concrete of under 50 lbs. density that tests above 1200 p. s. i. in compression.

Analysis of the four examples discloses that specimens from batches of a variety of porous lightweight aggregate materials either of mineral or vegetable origin, when mixed in water with an admix comprising in greater part clay before the addition of the Portland cement binder, produce concretes that test much stronger than those made otherwise. In Example 4, it is to be noted that every one of the eight batches made according to the invention used less cement in obtaining increased strength. Batch VI of Example 4 not only was stronger than batch I, it required almost 1½ bags of cement less per cu. yd. and was nearly 2 pounds per cu. ft. lighter.

From the results of tests on a much larger number of batches than those discussed in Example 4, it is apparent that molded masses of fiber-cement concrete may be made according to the invention that weigh 40-50 pounds per cubic foot, that have compressive strengths of more than 1000 to 2000 pounds per square inch, and that consist each of a hardset matrix of 200-300 parts by dry weight of Portland cement preferably of high early strength and $\frac{1}{20}$-$\frac{1}{6}$ parts of sodium sesqui-phosphate, this matrix binding 100-150 parts by weight of vegetable fiber aggregate particles passing a $\frac{3}{32}$" sieve and having multitudes of surface pores, and 10-80 parts of a buffering powder mixture having within said pores a greater concentration than of said cement and consisting of 1-60 parts raw finegrained clay (whether the alumina content is high or low seems less important than particle size) and 5-15 parts calcium chloride and ½-2 parts calcium sulfate and $\frac{1}{20}$ part crude salicyclic acid and $\frac{1}{20}$-$\frac{1}{10}$ part a wetting agent on the order of alkyl aryl sodium sulfonate.

In the examples, the admix used with the mineral aggregate materials was largely clay while that used with the vegetable aggregate materials was two-thirds clay, some highly colloidal and two-thirds of the balance was high alumina cement and calcium chloride, the rest comprising a sulfate, a wetting agent and a phosphate of sodium. As described in the "Sulphoaluminates of Calcium" published by the National Bureau of Standards, April 1929, the 3-5 and 5-3 calcium aluminates of high alumina cement differ from those dicalcium aluminates common to Portland cement. One difference is that the high alumina cement, added sulfate and chloride of my admix are chemically reactive when wet to produce the stabler of two forms of calcium sulphoaluminate in greater amount and more swiftly than can the constituents of the Portland cement binder. Since this stabler calcium sulphoaluminate crystallizes with swelling effect, it is desirable to concentrate the swelling constituents between the pores of the aggregate particles and the Portland cement matrix rather than in the matrix itself as in my co-pending applications. Individual particles of vermiculite, perlite and wood fiber are weak, are in fact inwardly compressible. As stated, the role played by clay in the masses described in my co-pending applications was obscure. But here, advantage is taken of getting not only the clayey but three concentrated and chemically reactive constituents of my admix between the pores of the porous aggregate particles and the Portland cement binder. Since crystals of calcium sulphoaluminate form subsequent to the set of the plastic Portland cement matrix surrounding the aggregate particles and at a time when the particles are beginning to lose water by evaporation, and in some instances to shrink, any swelling in the pores or between the pores and the matrix will tend to compensate for any moisture voids or shrinkage in the particles themselves. After masses made according to the invention are cured and dried, then again are wetted, both the colloidal clay and the three reactive chemicals (such portion as have not fully reacted) will tend to swell against the yielding resistance of the aggregate particles and thus to "tighten up" the internal structure with a minimum of damage to the cement matrix. That this is not a fanciful theory has been demonstrated in freezing and thawing tests carried through 50 cycles with a minimum of damage to specimens made according to the invention, often with increase of strength in the specimens so tested.

While waterproofing played no part in the examples cited, I have found the best integral waterproofers for my molded masses to be 5-25 percent by weight of the clay of a viscous additive selected from the group consisting of asphalt, formaldehyde resin, tung oil and a modified linseed (Admerol) oil, added after the Portland cement has been well mixed with the other ingredients. Such a viscous additive both strengthens and increases the moisture resistance of the molded masses otherwise made according to the invention.

Since the type of clay used is of primary importance, a simple test determines the probable better of two or more samples of clay serving the objects of the invention. Samples are dried and finely pulverized. 50 grams of each sample are well shaken with 200 ml. water in a pint glass jar. After 24 hrs. any clay except bentonite settles to the bottom leaving clear water at the top. With a rule, the depths of wet clay and clear water layers in each jar may be measured and compared. The less the depth of the water layer and the greater that of the clay, the better that particular clay is apt to prove in making the molded masses herein described. One of the best clays tested for my admix is (Ione #5) mined near Lincoln, Calif.

Limits as to the amounts of clay that safely may be used according to the invention depend on the character of the porous aggregate particles used and the weather resistance required of the molded masses. Clay of the more effective types as determined by the test just described has been used in amounts up to the weight of the portland cement with corresponding increases in strength, if not of durability. Apparently there is a point where the amount of clay becomes excessive so fas as concerns clogging the pores of the aggregate particles, a point where excess clay becomes merely a diluent of the matrix constituents and adversely affects weather resistance. Thus the proportions of the admixture and the question as to whether two different kinds of swelling constituents should buffer the pores of the porous aggregate particles from the Portland cement matrix, will depend on the character of the aggregate particles and the use to which the resultant concrete is to be employed. Relative to weight of cement used, the amount of clay may be as much as 30 per cent and, as shown in Examples 1, 2 and 3, the admix may comprise little else except very minor portions of wetting agent and sodium phosphate. But where a resilient and very porous aggregate material is used, such as vegetable fiber, in addition to a substantial amount of clay the admix will comprise up to 5 per cent by weight of the cement of chloride, up to 6 per cent by weight of the cement of high alumina cement and sulfate not exceeding 7 per cent by weight of the cement in both Portland cement binder and admix.

While the clays named herein are the preferred types, practice of the invention is not intended to be, nor is it limited to only those clays: many clays differing in name and chemical composition having in common the extremely finely divided aluminum silicate particles which are essential to securing the results described. For example, clayey residues of the bauxite from which aluminum metal is extracted, and containing a small fraction of sodium fluoride, have been found highly effective in making molded masses according to the invention. Nor are the calcium aluminate components of the admix limited exclusively to those found in high alumina cements. In countries where high alumina cement is not available, suitable substitute calcium aluminates may be made by mixing a high alumina clay, such as bauxite, 100 g. with colloidal clay, 50 g. and lime hydrate, 50 g. and a phosphate of sodium, 1 g. in water, 200 ml. and burning to a clinker as in making high alumina cement, then finely grinding the clinker. I have found that a fluoride of fluosilicate of sodium or fluospar itself may be substituted for the phosphate in making such a calcium aluminate for the admix used in making my molded masses.

It is to be observed, accordingly, that various changes in the proportions and methods of achieving best results in making the molded masses herein described may be made without departing from the spirit and scope of the invention as set forth in the appended claims; and it will be understood that any of the variants and modifications in the molded masses and components thereof and manner of their being brought together may be used separately and in any desired combination.

Having thus fully described my invention, its utility and comparison with similar molded masses made under prior art, what I claim and desire to secure by Letters Patent of the United States is:

1. A molded mass of fiber-cement concrete weighing under 50 pounds per cubic foot, having a compressive strength exceeding 1000–2000 pounds per square inch and comprising a hardset matrix of 200–300 parts by dry weight of Portland cement and $\frac{1}{20}$–$\frac{1}{5}$ part of sodium sesqui-phosphate, said matrix binding 100–150 parts by weight of vegetable fiber aggregate particles passing a $\frac{3}{32}$" sieve and having multitudes of surface pores, and 10–80 parts of a buffering powder mixture concentrated to a substantially greater degree than said cement within said pores and consisting of 1–60 parts fine-grained raw clay and 5–20 parts high alumina cement and 5–15 parts calcium chloride and $\frac{1}{2}$–2 parts calcium sulfate and $\frac{1}{20}$ part crude salicyclic acid and $\frac{1}{20}$–$\frac{1}{10}$ part alkyl aryl sodium sulfonate wetting agent.

2. A molded mass of weather-resistant concrete having a dry weight of under 100 pounds per cubic foot and a compressive strength of between 838 and 3075 pounds per square inch and consisting of lightweight concrete aggregate particles initially having open surface pores and diffused in a hardset matrix of 5.62–7.66 bags per cubic yard of Portland cement, said pores directly buffered from said cement by an amount of raw clay totalling in said mass no more than 1–60 parts for each 200–300 parts dry weight of said cement; said clay having a concentration within said pores substantially greater than said cement to keep said matrix outside said pores and said aggregate particles having a greater bulk than said cement.

3. The molded mass of claim 2 wherein said aggregate particles are selected from the vesicular mineral particles group consisting of expanded slag, exfoliated vermiculite, popped perlite, pumice, cinders and baked expanded clay slate and shale.

4. The molded mass of claim 2 wherein said aggregate particles are selected from the cellular vegetable fiber particles group consisting of sawdust, shavings, milled wood wastes, wood wool, finely divided plant fibers including those retaining and those separated from their lignin, and milled paper wastes.

References Cited in the file of this patent

UNITED STATES PATENTS

| Number | Name | Date |
|---|---|---|
| 247,636 | Grunzweig | Sept. 27, 1881 |
| 291,114 | Wadleigh | Jan. 1, 1884 |
| 665,860 | Amies | Jan. 15, 1901 |
| 1,157,234 | Lester | Oct. 19, 1915 |
| 2,057,330 | Eichert | Oct. 13, 1936 |
| 2,081,963 | New | June 15, 1937 |
| 2,122,192 | Batcheller | June 28, 1938 |
| 2,233,973 | Dunn | Mar. 4, 1941 |
| 2,463,927 | Watts | Mar. 8, 1949 |
| 2,553,618 | Willson | May 22, 1951 |

OTHER REFERENCES

Willson: Final Report on Properties of Assorted Light Weight Aggregates, pages 11–14 and Appendix B–7 to Appendix B–10, August 23, 1946. Published by the Office of the Publication Board, Dept. of Commerce.